June 21, 1955     S. FELDMAN     2,710,973

FISHERMAN'S CAP

Filed Jan. 23, 1951

INVENTOR.
SAMUEL FELDMAN

BY *AWimburn*

ATTORNEY.

United States Patent Office 2,710,973
Patented June 21, 1955

2,710,973

FISHERMAN'S CAP

Samuel Feldman, New York, N. Y.

Application January 23, 1951, Serial No. 207,287

1 Claim. (Cl. 2—199)

This invention relates generally to wearing apparel in the nature of caps and the like.

An object of the invention is to provide a novel and improved article of headwear in the nature of a cap, which is provided with novel construction for safely carrying fish hooks and other articles.

Another object of the invention is to provide a sporting cap in which there is a flap secured to the cap body for the purpose of carrying fish hooks, the flap being apertured for reception of the shanks of the hooks, and so arranged as to provide means for maintaining the sharp points of the hooks in safe position, so that the fisherman will not accidentally be injured thereby.

Still another object of the invention is to provide a novel sporting cap in which a plurality of flaps are provided, secured to the cap body, and forming a sort of pocket for the reception of the fish hooks carried by the fisherman, one of the flaps being apertured to allow the shanks of the hooks to extend therethrough, and either one or both of the flaps being provided with a surface portion which is normally impenetrable by the points of the fish hooks, thus protecting against injury therefrom, the flaps being easily opened out to allow access to the hooks for withdrawal when needed.

A further object of the invention is to provide a novel sporting cap in which the fish hook concealing and containing flap means is hinged to the cap body from above, so that the depending end of the flap means may be removably secured in position by snap fasteners.

Still a further object of the invention is to provide a novel form of sporting cap of the type described, in which the fish hook concealing and containing flap means is hinged to the cap body at one side, and extends across the front of the cap body, being secured removably at its other end by a snap fastener or the like.

Still another object of the invention is to provide a novel form of cap of the type described, which is simple in design, inexpensive to manufacture, and highly effective for the purpose intended, being safe and foolproof, against accidental injury from fish hooks.

Other objects and advantages of the invention will become apparent from the following description of a preferred embodiment thereof as illustrated in the accompanying drawings, and in which, Figure 1 is a top plan view of a cap embodying the invention, showing the hook retaining flap in closed position, and some fish hooks carried on the cap;

Figure 1:
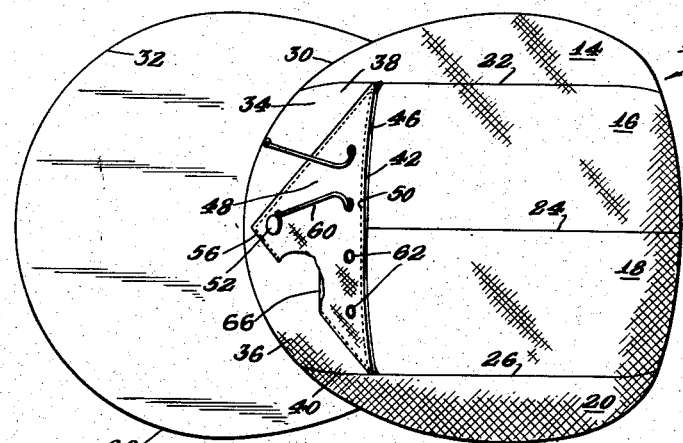
Figure 2:
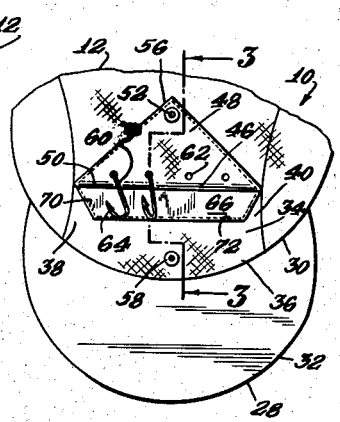
Figure 2 is a fragmentary front elevational view of the cap shown in Figure 1, but of smaller size and with the hook retaining flap in opened out position.

Fishermen are frequently at a loss for convenient and adequate storage space for their spare fish hooks, and many times are injured by catching their hands or other parts of the body on the exposed sharp points of such spare fish hooks. These hooks are often carried right on the coats or caps of the fishermen, and unless a high degree of care is used, injury is bound to occur. The present invention provides a novel cap construction suitable for fishermen, by means of which the spare fish hooks may be carried on the sporting cap with a high degree of safety, while remaining freely accessible to the fisherman, when needed.

In order to understand clearly the nature of the invention, and the best means for carrying it out, reference may now be had to the drawings, in which like numerals denote similar parts throughout the several views.

As shown, there is a cap 10 of any well known type, including a cap body or crown 12 which fits onto the head of the wearer, and which may be divided into several sections of fabric such as those shown at 14, 16, 18 and 20, which are suitably stitched together along stitching lines 22, 24 and 26 to provide the necessary rounded curvature of the cap body, so as to fit the head in the manner well known to the art. A cap front or visor 28 extends forwardly from the cap body 12, being secured thereto along stitching line 30 in any well known manner. The cap visor 28 may be curved or rounded along its outer edge 32 as shown, and may be formed of several layers of fabric with a stiffening interlining sheet of cardboard or other material, so that it will maintain its shape.

Figures 3, 4:
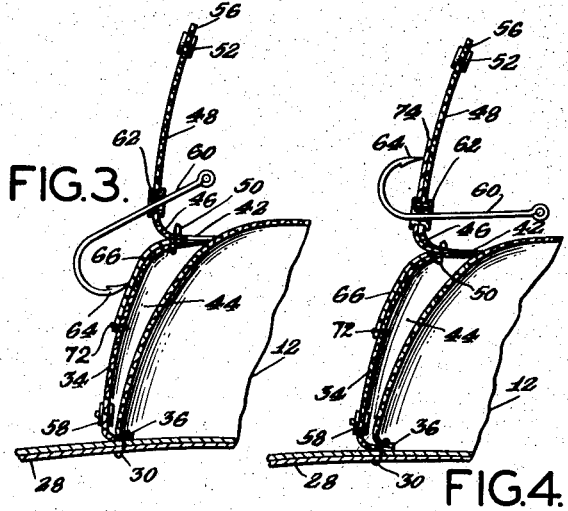
Figure 3 is an enlarged cross-sectional view taken substantially along the line 3—3 of Figure 2.
Figure 4 is a cross-sectional view similar to Figure 2, but showing a first modified form of the invention.

As best seen in Figures 1 and 3, a pocket forming front wall or fabric 34 is disposed on the forward portion of the cap crown, being secured thereto along its bottom edge 36 by the stitch line 30, and along its two sides 38 and 40 by the forward portions of stitching lines 22 and 26 respectively. This leaves unsecured, the upper edge 42 of the front wall 34, thus forming an upwardly open pocket or recess 44, for the reception of articles, such as matches, cigarettes, and the like.

Secured to the upper edge 42 of the front wall 34, is the upper margin 46 of the hook retaining flap member 48, this being secured thereto by means of a stitching line 50, so that the flap member 48 normally hangs or depends from the upper margin of the front wall 34 in the manner of Figure 1, so as to overlie the same. The flap member 48 may conveniently be formed of fabric in one or more layers, and may be progressively narrower in a downward direction, as shown in Figure 1, having a snap fastener socket member 52 secured to its apex or narrowest portion 56, to engage with the matching snap fastener post or stud member 58 secured to the lower portion of the front wall 34 as shown, when in closed position shown in Figure 1.

The shanks 60 of hooks shown may be inserted through eyelets 62 in the manner shown in Figures 1 to 4, with the sharp points 64 of the hooks normally in the space between the flap 48 and the wall 34 when in closed position. As shown in Figure 3, a strip of plastic sheeting or other material 66 having a hard smooth surface is secured to the upper marginal area of the front wall 34, between wall 34 and the flap 48, by means of stitching line 50, and may also be secured to the wall 34 by additional stitching on lines 70 and 72 (see Figure 2). The sheet 66 may be of any material which is flexible and yet resistant to penetration by the sharp points of the fish hooks.

There is thus provided a separate compartment for the fish hooks independent of the pocket for cigarettes and matches, so that the fisherman fumbling in the pocket for a match or cigarette will not be injured by the fish hooks.

Figure 4 shows a modified form of the invention, which is similar to that of Figure 3, except that an added strip of plastic or other sheet material 74 may also be secured to the undersurface of the flap 48, so as to resist penetration by the sharp points of the hooks when turned around to the position shown in Figure 4.

Figure 5:
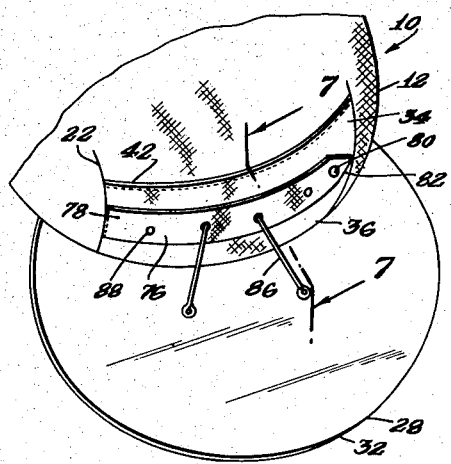
Figure 5 is a fragmentary perspective view of a cap showing a second modified form of the invention, the hook retaining flap being shown in closed position with some hooks retained thereby.
Figure 6:
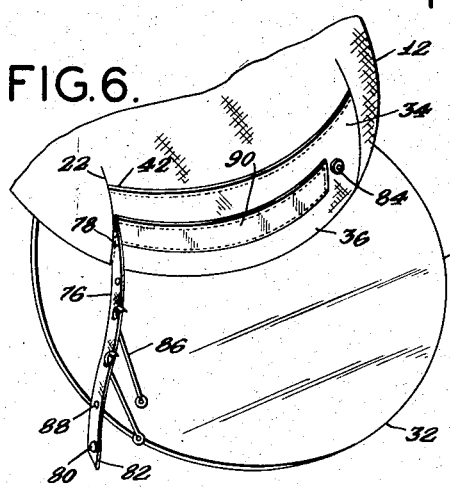
Figure 6 is a perspective view similar to that of Figure 5, but showing the protective flap in opened-out position.
Figure 7:
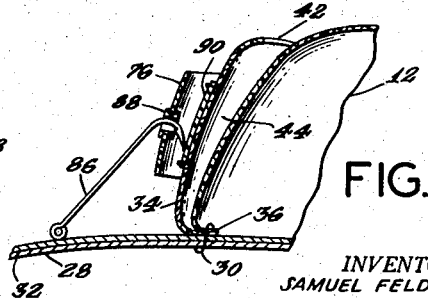
Figure 7 is an enlarged cross-sectional view taken substantially along the line 7—7 of Figure 5.

Referring now to Figures 5, 6 and 7, it is seen that there is another modified form of the invention, in which the construction of the cap and pocket wall 34 is the same as in Figures 1 to 4. However, instead of securing the protective flap to the upper margin of the wall 34, as was done in Figure 1, a lateral flap or strip 76, formed of fabric or other flexible material, is secured at its left end portion 78 to the cap body 12 by means of the stitching line 22, and has a snap fastener socket member 80 secured to its other end 82 for engagement with a snap fastener stud member 84 secured to the wall 34. Fish hooks 86 are inserted through eyelets 88 in the manner shown in Figures 5 and 7, so that their pointed ends are between the inner surface of the flap 76 and a strip 90 of plastic or other suitable resistant sheeting secured to the front surface of the wall 34 by stitching as illustrated, in underlying position to the flap 76, as seen in Figures 6 and 7. It is clear that the eyelets 88 should be large enough to permit withdrawal of the hooks therethrough. The flap 76 may also have a second plastic strip secured to its undersurface for further protection, similar in purpose and function to that of the strip 74 shown in Figure 4.

Although I have described my invention in specific terms, it will be understood that various changes may be made in size, shape, materials and arrangement without departing from the spirit and scope of the invention.

I claim:

A cap comprising a cap body, adapted to be fitted over the head of a wearer, a pocket forming wall secured to said cap body and free from attachment thereto along its upper edge, to define a pocket, flap means secured at one end thereof to a side portion of said cap body and extending across the front of said pocket forming wall, fastening means engaging the opposite end of said flap means for releasably securing the same to the opposite side portion of said cap body, said flap having a plurality of apertures formed therein to receive fish hooks with the points thereof extending between said flap and said pocket forming wall, and penetration resistant means on said pocket forming wall and underlying said flap so as to block penetration thereof by said fish hooks.

References Cited in the file of this patent

UNITED STATES PATENTS

| | | |
|---|---|---|
| D. 160,404 | Levine | Oct. 10, 1950 |
| 324,073 | Baruch et al. | Aug. 11, 1885 |
| 929,240 | Novoson | July 27, 1909 |
| 1,133,542 | Deal | Mar. 30, 1915 |
| 1,161,637 | Dunn | Nov. 23, 1915 |
| 1,451,174 | Mirus | Apr. 10, 1923 |
| 1,588,536 | Fischer | June 15, 1926 |